United States Patent [19]

Bernstein et al.

[11] 4,385,019
[45] May 24, 1983

[54] PRODUCTION OF A POLYMERIC ACTIVE COMPOSITION

[75] Inventors: Philip Bernstein, Glen Ridge, N.J.; James P. Coffey; Alan E. Varker, both of Warwick, N.Y.; John T. Arms, Monroe; William D. K. Clark, Warwick, both of N.Y.; Paul D. Goodell, Ridgewood, N.J.

[73] Assignee: MPD Technology Corporation, Wyckoff, N.J.

[21] Appl. No.: 226,454

[22] Filed: Jan. 19, 1981

[51] Int. Cl.³ .......................................... B29D 27/00
[52] U.S. Cl. .................................... 264/49; 204/293; 204/296; 252/181.2; 252/181.6; 252/181.7; 264/148; 264/150; 264/176 R; 429/42
[58] Field of Search ............. 264/49, 148, 150, 176 R; 429/42; 252/181.2, 181.6, 181.7; 204/293, 294, 296

[56] References Cited

U.S. PATENT DOCUMENTS

| | | | |
|---|---|---|---|
| 3,054,761 | 9/1962 | Moore et al. | 264/49 X |
| 3,060,254 | 10/1962 | Urry | 136/24 |
| 3,121,029 | 2/1964 | Duddy | 136/19 |
| 3,375,208 | 3/1968 | Duddy | 260/2.1 |
| 3,407,249 | 10/1968 | Landi | 264/49 |
| 3,630,781 | 12/1971 | Rampel | 136/31 |
| 3,679,614 | 7/1972 | Shah et al. | 264/49 X |
| 3,796,778 | 3/1974 | Gallacher | 264/49 |
| 3,838,092 | 9/1974 | Vogt et al. | 260/33.6 F |
| 3,843,570 | 10/1974 | Murayama | 264/49 X |
| 3,881,960 | 5/1975 | Haschka et al. | 136/120.7 C |
| 3,898,099 | 8/1975 | Baker et al. | 136/75 |
| 3,954,501 | 5/1976 | Rampel | 136/24 |
| 4,036,944 | 7/1977 | Blytas | 423/648 R |
| 4,107,395 | 8/1978 | van Ommering et al. | 429/21 |
| 4,110,425 | 8/1978 | Buhl et al. | 423/648 |
| 4,339,325 | 7/1982 | Solomon et al. | 204/296 |

Primary Examiner—Philip E. Anderson
Attorney, Agent, or Firm—Raymond J. Kenny; Miriam W. Leff

[57] ABSTRACT

A process is provided for forming a polymeric material which can be developed into a shaped polymeric structure comprising an active material encradled in a porous, fiber-containing polymeric composition. In the process, the active material is mixed with a tripartite system comprising a fibrillatable polymer, a support-contributing polymer and a pore-former. When such a system is mixed and developed with an active material, such as $LaNi_5$, an active composition is produced which may be used, for example, as a hydrogen collecting or storing material.

16 Claims, 2 Drawing Figures

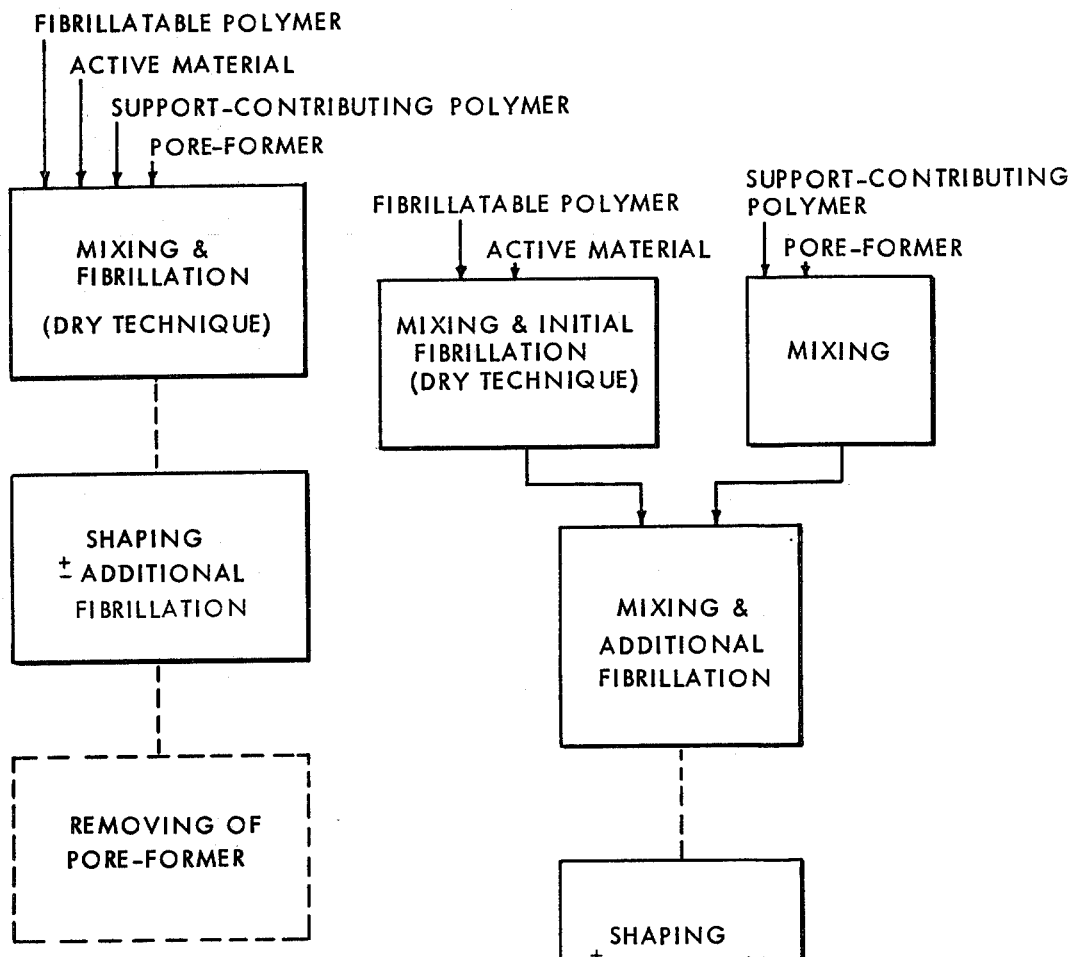

PRODUCTION OF A POLYMERIC ACTIVE COMPOSITION

The present invention relates to a process and a composition for forming an active material encradled in a porous, fiber-containing polymeric material and products formed therefrom.

BACKGROUND OF THE INVENTION

The use of inert materials to envelop particulate active materials for structural, storage and other purposes is well known. The active material may be, for example, gas collecting and storing compositions, and electrochemically active compositions. By "inert" is meant that the material is inactive or not harmful, e.g. chemically or electrically, to the active material or to the system in which the active material is ultimately used. In the compositions contemplated in the present invention, it is important that the inert material retain the active material but without, or with minimum, sacrifice of access to the surfaces of the active material and without interfering with the active function of the particles.

It has been particularly difficult to find a material which will tolerate large changes in volume of the enveloped particles, such as that which occurs in many hydridable compositions when they are used for hydrogen sorption characteristics. The hydridable materials which undergo volume changes in use have a tendency to disintegrate and this causes many problems such as loss of materials and plugging of the equipment. The present process is disclosed particularly with reference to materials having particulate hydridable compositions as the active components of the system.

Various inert materials have been proposed for coating particulate hydridable compositions. U.S. Pat. No. 3,881,960, for example, discloses hydrogen storage electrodes for galvanic cells in which the particles are coated with $TiNi_3$. The $TiNi_3$ is inactive, has high hydrogen permeability and is sufficiently elastic so that it can withstand the volume changes of the active components. Cost considerations and the difficulty in coating the particle surfaces make this method impractical. U.S. Pat. Nos. 4,036,944 and 4,110,425 disclose hydridable materials bonded in a polymeric matrix. In the '944 patent, the binder is a thermoplastic elastomer having a specified block copolymer structure, and pellets containing 50% to 99% of active component are formed from a paste. The paste is pelleted under pressure. In the '425 patent, the active material having a specified grain size range is formed by cementing or sintering the hydrogen-storing powders with heat resistant plastics. In the preparation, the active particles are mixed with the plastic in the form of a powder, suspension, emulsion, solution or melt. The examples show that an emulsion is used.

Polymeric structures such as those described above do not allow for maximum exposure of the surface of the active material.

OBJECTS OF THE INVENTION

It is an object of the present invention to overcome or alleviate the above-noted problems of the prior art.

It is also an object of the present invention to provide a suitable polymeric structure for hydridable material.

An additional object is to provide a process which is amenable to standard polymer processing equipment and one which will permit the production of unlimted size shape and form of the polymer structure.

Additional objects will become apparent from the disclosure which follows.

BRIEF DESCRIPTION OF DRAWING

FIGS. 1 and 2 are flow diagrams showing alternative embodiments of the process of the present invention.

THE INVENTION

In accordance with one aspect of the present invention a polymeric active composition is provided which comprises an active material encradled in a porous, fiber-containing polymeric material. The polymeric active composition is formed from (a) active particles (or a precursor thereto) and (b) a tripartite system comprising (1) a fibrillatable first polymer, (2) a support-contributing second polymer, and (3) a major amount of a pore-former, the pore-former being characterized in that it is removable from the mixture and it can be uniformly dispersed in the system, said components of the tripartite system being non-reactive with each other, with the active material, and with the environment in which they will be used. Preferably, the pore-former wets or can be made to wet the surfaces of the active particles. Advantageously, the pore-former is a water-soluble resin, and it is conveniently removed by dissolution in water.

In accordance with another aspect of the present invention a polymeric active composition comprised of an active material and a porous, fiber-containing polymeric material is prepared by a process comprising subjecting a support-contributing polymer, a fibrillatable polymer, an active material, and a removable pore-former, to conditions to fibrillate the figrillatable polymer and to form an intimate mixture of the fibers, support-contributing polymer and pore-former, and then removing the pore-former to provide porosity in the composition. In the resultant system fibrils encradle the active material and the fibril-encradled active material is dispersed throughout an intimate mixture of fiber-containing polymeric material.

In a preferred embodiment of the present invention, the conditions are such that fibrillation is achieved in-situ by a dry processing technique, thereby achieving very good distribution of the fibers in the composition and permitting greater freedom in materials and processing steps that can be used. This is of particular advantage when water or moisture—or some other liquid, which might be the mixing medium, is harmful to one of the components such as the active material. Also, by using a dry processing technique for fibrillation, it is possible to carry out the production of the material including fibrillation in standard polymer processing equipment. Another advantage is that, if desired, the final product can be produced in a form which does not require a supporting structure. An essentially self-supporting structure can be formed in accordance with this invention without sintering the polymeric material.

It has been found that in the polymeric active composition of the present invention, the active material is held in the composition, but with maximized exposure of the surfaces of such material. It is believed that this is because the active particles are held in place by a fibrous network but the surfaces are free and exposed, with easy access to said surfaces through the pores.

It is a feature of the present invention that the porosity of the polymeric active composition can be controlled with a pore-former. Indeed by various techniques the size and shape of the pores can be controlled, and the pores can be made interconnecting and dispersed throughout the material. Thus, there is no dependence on the polymer for its inherent microporosity. And, although there is no inherent reason which would preclude one from using extrinsic means such as molded channels or honeycomb configurations with the present materials, the active compositions are not dependent on such configurations for providing contact of external reacting environment, e.g. a gas such as hydrogen, with the active material.

In general, the polymeric active composition can be produced in any shape or form that a polymeric material can be used. For example, it can be used in particulate form, e.g. as granules or shaped as pellets, rings, spheres, cylinders and the like, and can be used as sheets, bars, film. It can be self-supporting or supported. The product, which advantageously can be produced in standard polymer processing equipment, can be molded, extruded, milled, blown into film, or otherwise formed into the desired shape.

DETAILED DESCRIPTION OF THE INVENTION

As indicated above, the polymeric active composition is composed essentially of an active (or activatable) material, a fibrillated first polymer, and a support-contributing second polymer, and it is characterized in that it is porous and the pores are formed in-situ by a method which maximizes the accessibility of the active material. The composition is produced from active material and a tripartite system.

The components of the tripartite system should, of course, be compatible and non-reactive with each other and the polymers should be non-active in the environment in which the ultimate product will be used. It is essential that the fibrillatable polymer be capable of dispersing in the support-contributing polymer. The specific choice of support-contributing polymer will depend on the ultimate use of the polymeric active composition. In general, in addition to serving the dispersing function for the fibrillatable polymer, the support-contributing polymers must be compatible with and chemically stable in the environment in which the material will be used, they must not impede the function of the apparatus for which they are used, and they must serve the structural purpose for which they are intended. It is an advantage of the present materials that they can be provided with strength and structural integrity combined with flexibility depending on the choice of polymer. The use of the support-contributing polymer in addition to the fibrillatable polymer adds another dimension of freedom to the system. By way of illustration, the following polymers can be used either individually or in suitable combinations: polyolefins, such as polyethylene, polypropylene, polybutylene, polyisobutylene or co-polymers thereof with each other or with ethylacrylate and/or vinyl acetate; halogenated polyhydrocarbons and co-polymers; polyamides; polysulfones; polyacetates; polycarbonates; polyesters; cellulose esters; or silicones. Preferred support-contributing polymer compositions for hydrogen-storage members are thermoplastic polymers such as polyolefins, e.g. polyethylene, polypropylene and co-polymers thereof, because they are substantially saturated compounds and as such would have no interaction with the active material.

The fibrillatable polymer should, of course, be compatible with the support-contributing and be capable of dispersing in it, and it should be non-reactive with the environment in which it is to be used. Fluorocarbon and propylene polymers have these suitable characteristics. Particularly useful for the process of the present invention, are polymers which are fibrillatable in a dry-type process. Such polymers are known. For example, polytetrafluoroethylene (PTFE) can be fibrillated from a dry powder and it is commercially available as duPont's "Teflon" 6A and 7A. Fibrillatable polypropylene is available, for example, as strands, tape or film which can be used, e.g., as such or cut or chopped to appropriate size. The fibrous component is effective even when present in small amounts, e.g. about 0.5 to 5%, typically about 1–2%, by weight of the active porous composition.

The pore-forming component of the tripartite system must be removable since, to develop the porous active composition, after fibrillation the pore-forming agent is removed leaving the active particles encradled by fibers. The poreforming component is further characterized in that it is non-reactive with the active material and other components of the system and it wets or can be made to wet the surfaces of the active material. That is, the pore-forming agents will spread on or can be made to spread on the active material. It is preferred that the pore-former be capable of serving as a processing agent in the system, and if so, that it melts below the temperature at which the active material will react. By removable is meant that the poreformer can be removed in any way that is not harmful to the remaining components and in a way that will leave the remaining material in a porous condition. In accordance with the present invention, the pore-former serves as incipient sites for the pores, and after removal, the porosity can be interconnecting and dispersed through the material. The pore-former may be, for example, leachable directly, convertible to leachable compositions or to gaseous products. Leachable pore-forming agents may be selected, for example, from water-soluble, base-soluble, acid-soluble or organic solvent-soluble resins. Water-soluble resins can be removed by leaching with water. It is noted in this regard that addition of water to the formulated fibrous material is not critical or disadvantageous since water added at this stage does not interfere with the advantageous freedom in processing of the dry mix. Examples of pore-formers of the water-soluble type are polyolefin oxides such as polyethylene oxide and polypropylene oxide. Examples of other leachable pore-formers are polyethylenimine, which can be leached with dilute sulfuric acid; polyacrylic acid, which can be leached with dilute sodium hydroxide; and paraffin waxes, which can be leached with halogenated solvents. Removal can also be effected by enzymatic breakdown. Generally, it is possible to use any of the known pore-forming techniques for polymers so long as it is compatible with the system.

A preferred characteristic of the pore-former of this invention is that it is a polymer. As such it is compatible with the fibrillatable polymer and can serve as a system without the need for using very large quantities of additives which must be removed from the fibrillatable polymer, e.g. by filtration, before dry processing. That is, advantageously the polymeric pore-former serves as the medium which permits the combination of other components of the system to be uniformly distributed and conveniently worked. The amount used is predetermined primarily by the amount of porosity desired and not by the processing needs of the fibrillatable polymer. And in accordance with the present invention, processing can be carried out in standard polymer processing equipment. Since, the pore-former is by definition removable, no unwanted ingredients are added to the system. A further advantage of using a polymeric pore-former is that is can be used at normal working temperatures for polytetrafluoroethylene or polypropylene, i.e. about 75°–100° C. without reaching a hazardous flash point. For example, Stoddard solvent, which is sometimes considered a medium for working polytetrafluoroethylene, is unsuitable for the present process because it has a flash point of 100° to 110° F. Vehicles also not suitable for the present process are those, such as low molecular weight paraffins, naphthenes, or aromatics such as naphthalene, benzene, or industrial solvents which are mixtures of various organic compounds, e.g. Shell-Sol B or mineral spirits, which may volatilize during working on the processing equipment. A critical problem with vehicles which volatilize during processing is that the pore-former is removed before it can serve as the incipient sites for the pores.

As indicated above, the pore-forming agents, apart from being removable, are further characterized in that they are non-reactive with the active material and polymeric material, and preferably they wet or can be made to wet the active material. It is believed that if the pore-former coats (i.e. wets or spreads on) the surfaces of the active material, i.e. before removal, this will contribute to the accessibility of the active materials when the pore-former is removed. A surfactant may be added to improve the wettability of the pore-former.

Pore-formers such as certain polyolefin oxides, e.g. polyethylene oxide and polypropylene oxide, in addition to being conveniently water-soluble and having suitable melting temperatures (e.g. polyethylene oxide has a melting temperature below 75° C.), have the advantage that they serve as both pore-forming and processing agents for fibrillatable polymers such as polytetrafluoroethyene and polypropylene. In one embodiment of the present invention, the pore-former will also serve as the support-contributing polymer. In such embodiment after removal of the pore-former, the essential constituents of the porous composition will be the active material and the fibrillated polymer. In general, such pore-formers have molecular weights in the neighborhood of 100,000 to 1,000,000.

The amount of pore-former to be incorporated in the precursor electrode composition is dependent on the amount of porosity desired in the ultimate product. In general, the pore-former is present in the precursor material in a major amount, i.e. at least about 10% by weight, typically about 15% to about 50%, and preferably over 25 or 30 weight %. In a hydride system, for example, it is desirable to have maximum exposure of the active material and to have free movement of hydrogen throughout the mass. To achieve this, the porous, polymeric active composition, preferably, has about 70 to 80 volume % porosity, and the pores should be interconnecting. For such porosity, an equivalent volume % of leachable pore-former is needed in the precursor electrode composition, i.e. about 70 to 80 volume %. This is equivalent to about 15 to 50 weight % of polyethylene oxide. To obtain porosity of this extent and type using a fugitive gaseous pore-former considerably more pore-former would be necessary, and this could be estimated based on the volume of gas produced and conditions.

The active materials of the present invention, as indicated, above, find utility for a wide variety of purposes. The active material is, of course, chosen accordingly. For example, the active material may be useful for storing or collecting gases, may have electrochemical properties, or may be catalytically active and the polymeric active composition may then be used, e.g., as a $H_2$ getter in a waste stream, as a $H_2$ electrode, in a battery as an electrode or a separator membrane. By way of example, the active material may be comprised of a hydridable material which can be used for $H_2$ storage, as a $H_2$ collector, in a hydrogen pump or refrigerator, or in a battery. Hydrogen sorbent materials are wellknown. They include both pure metals such as Mg, Ti, V, Nb and Pd, and binary, tertiary and more complex alloys of, e.g. rare earths, Ti, Co, Ni, Fe, Zr, Mg, Ca, Mn, and mixtures and other combinations thereof. Illustrative examples are $LaNi_5$, $LaNi_{4.7}Al_{0.3}$, $LaNi_{5-x}Al_x$, $LaCo_5$, $LaNi_3Co_2$, FeTi, (Fe,Mn)Ti, $Mg_2Ni$ and $Ti_2Ni$. The conditions for $H_2$ absorption and desorption can differ considerably, depending on the active material, and therefore the materials of choice for the support-contributing polymer, fibrillatable polymer and pore-former may depend on the active material chosen as well as the ultimate environment in which the composition is to be used. Other materials such as Ni or platinum group metals which have electrode activity can be the active materials. The active material of the composition may consist substantially entirely of active material per se or it may be comprised of active material and other components which are related to the function of the active material or its function in the polymeric composition. For example, the catalyst material may be supported on a carrier, the hydridable material may contain ballast, etc. The active material may also include components or components in special form which will enhance the thermal or electrical properties of the composition.

In general, the active material is in particulate form. With respect to the hydrogen sorbent materials, for example, it can be very fine, e.g. substantially all powder which will pass a −100 mesh screen or it can be coarse, e.g. the particles will pass a −10 mesh screen. The very fine powder is indicative of "pre-activated" active material. The coarse powder is characteristic of material which has not yet been activated. The coarse powder will tend to disintegrate on use. It is an advantage of the present invention that the particles can be very fine initially or during use since the particles will be held in the polymeric structure. This permits high activity while minimizing losses due to attrition of the active material.

The active material may be initially active or can be activated, e.g. by treatment with an activating gas under suitable conditions prior to or during use.

In general, the polymeric composition prior to removal of the pore-former is active comprised, by weight, of about 50% to 75% active material, about 0.5 to about 5% fibrillatable polymer, about 47% to about 10% pore-former, and the balance essentially support-contributing polymer. After removal of the pore-former, the polymeric active composition is comprised, by weight, of about 75% to 95% active material, about 1 to about 5% fibrillated polymer and the remainder essentially support-contributing polymer.

Typically the tripartite system from which the fibrillated, porous polymer is developed will have the following composition in weight:

| Component Type | Example | Typical Range (approx) (parts by weight) |
|---|---|---|
| Support-Contributing Polymer | Low Density Polyethylene | 5 to 10 |
| Fiber-forming Agent | Teflon 7A | 1 to 5 |
| Leachable Resin | Polyox WSRN-10 | 40 to 60 |

To this mixture may be added, e.g. 142 parts $LaNi_5$. The relative concentration of polymer: active material will vary according to the processing necessary to produce the final shaped product. In the case of a $H_2$-sorbent material using $LaNi_5$ as the active material, a product of this invention will typically be composed predominantly (i.e. over 50 weight %) of active material, preferably about 75% to about 95% active material. Alternatively, the nonpolymeric component may be comprised of an active material plus a thermal ballast. In the above example, 142 parts to be added to the polymeric components would be a 25/75 mixture of $LaNi_5$ (hydride former) and Ni 123 (thermal ballast). In the event, thermal ballast is incorporated with the active material, the total active material plus thermal ballast in the hydrogen sorbent composition will be about 75% to about 95% by weight. For further disclosure about thermal ballast, reference is made to U.S. application Ser. No. 11,194, filed February 2, 1979 (incorporated herein by reference) entitled "Thermal Reaction Heat Storage Method for Hydride Tanks".

To prepare the porous, active, fiber-containing composition, the initial components (i.e. the active material, the fibrillatable polymer, the support-contributing polymer and the pore-former) are first converted to the precursor polymeric composition by a method comprising subjecting such components to conditions to convert the fibrillatable polymer, preferably by a dry processing technique (e.g. as a powder or tape under shear stresses) to fibrous form and to transform the components to a material composed of discontinuous fibers throughout a substantially homogeneous composition consisting of active material, support-contributing polymer and pore-former. The terms "fibrils" and "fiber-containing" refer to discrete fibers developed from the fibrillatable polymers during processing to fibrillate the first polymer and intimately disperse components of the system. The components can all be blended together initially, e.g. in a blender such as a Banbury mixer or a ball mill, and then processed, e.g. in an extruder. Alternatively, the components can be mixed with each other and processed in various sequences depending on the desired ultimate configuration and the equipment used. Advantageously, the fibrillatable component is processed in-situ by a dry processing technique to the fibrous component of the precursor polymeric composition. By fibrillated in-situ is meant that it is fibrillated in the presence of at least one component of the composition, e.g. the active material. By removal of the pore-former, the precursor polymeric composition is converted to the porous product.

Two of the embodiments of the process of the present invention are illustrated in FIGS. 1 and 2 of the accompanying drawing. In the embodiments shown the dotted lines between the formulation step and shaping step signify, as indicated above, that shaping can occur during the formulation. As illustrated in the figures, the formulation can be carried out in one or more steps.

The polymeric active composition or precursor thereto can be formed as pellets or other particulate forms and used as such or the pellets can be converted to the desired shape by the usual polymer processing techniques, e.g. extrusion, molding, blowing or combinations thereof. As indicated above, with appropriate choice of processing technique, the components can be processed from a dry particulate mixture directly to a sheet or bar. The thickness of the sheet or bar can be varied and the product can be produced directly as a flexible sheet or film. Alternatively, for example, it can be made into pellets and the pellets extruded and blown to a film or the pellets can be injection molded to a film. The ultimate shape is determined by those skilled in the art for the task intended for the active material.

In a system in which polyethylene is the support-contributing polymer and a water-soluble resin such as polyethylene oxide is the pore-former, mixing can be carried out as a continuous process simultaneously with fibrillation, e.g. in a two-roll mill at 65°–75° C., using the addition sequence: (1) support-contributing polymer, (2) removable pore-former (e.g. a water-soluble resin), (3) fiber-forming resin, (4) active material. As one alternative, batch compounding can be carried out in several sequences, in a mixing vessel such as a Banbury mixer or a twin-screw extruder. For example, pre-fibrillation of the fiber-forming agent (such as Teflon 7A) and active materials can be carried out in a mixer to create maximum fibrillation and dispersion of fibers in the active material. This material is removed from the mixer. The mixer is pre-heated to temperatures of about 75°–100° C. and operated at a controlled mixing speed of 14 RPM. The mixing addition sequence is as follows: First, the support-contributing polymer and water-soluble pore-former resin are added to the mixer and mixed at a temperature of about 65° C. to about 75°–100° C., for about 5 to 10 minutes to insure fluxing. Next a pre-blend of active material and fibrillated polymer is added. The total composition is mixed for an additional 5–10 minutes. The resultant mixture is removed from the mixer and pressed into thin sheets for pelletizing to ⅛" cube. The material is now ready for extrusion, compression molding, injection molding or calendering. It is noted that the material can be extruded, and compositions of this type have been extruded, for example, through a 1/16 inch die into a continuous rod form. If a water-soluble resin, such as Polyox WSRN-10, is used after being extruded as rod (or tubular) form, the extruded form is now leached in water at a temperature of 50° C. to remove the water-soluble resin. After drying, the materials are cut to required lengths, with the active $LaNi_5$ or other active material now exposed and encradled in a complex of fibrils. The fibrils are also dispersed throughout the support-contributing polymer. The fibril-encradled active material is dispersed throughout the porous, fiber-containing polymeric composition.

It will be understood by those skilled in the art that the selection of any particular ingredient in a system is a matter of selection depending on ultimate use, availability of materials, cost, etc., and the present invention is not restricted to the particular ingredients disclosed or to the examples. They are merely given as a guide to understanding the present invention. In the illustrative examples given below, $LaNi_5$ is encradled in a fibrillated, porous polymer material. In all examples, the initial "mix" is formed as a mixture of dry powders. The Teflon 7A, a product of duPont, is an extrudable grade of PTFE. WSRN-10, a product of Union Carbide, is the polyethylene oxide component. The LaNi$_5$ is used as a finely divided powder (over 50% passing a −325 mesh screen).

EXAMPLE I

| The Mix | |
| --- | --- |
| Thermoplastic Support-Contributing Polymer: | 9 grams polyethylene |
| Fibrillatable polymer: | 1 gram Teflon 7A |
| Pore-former: | 40 grams WSRN-10 |
| Active ingredient: | 142 grams LaNi$_5$ |

The mix is completely blended in a Banbury mixer for 17 minutes at room temperature. The resulting mixture is extruded to rod or tube shape through a 19 mm Haake extruder having a screw with an L/D ratio of 20:1. The extruded tubes or rods are now leached in water at a temperature of about 50° C. to remove substantially all of the water soluble resin, thereby forming a porous structure with a maximum amount of active materials exposed. The active LaNi$_5$ is now encradled in a fibrous network within the structure.

EXAMPLE II

| The Mix | |
| --- | --- |
| Thermoplastic Support-Contributing Polymer: | 5 grams polypropylene |
| Fibrillatable material: | 0.75 grams Teflon |
| Pore-former: | 30 grams WSRN-10 |
| Active ingredient: | 100 grams LaNi$_5$ |

The mix is completely blended in a Banbury mixer for 17 minutes at room temperature. The resulting mixture is extruded to rod or tube shape through a 19 mm Hakke extruder having a screw with an L/D ratio of 20:1. The extruded tubes or rods are now leached in water at a temperature of about 50° C. to remove substantially all of the water soluble resin, thereby forming a porous structure with a maximum amount of active materials exposed. The active LaNi$_5$ is now encradled in a fibrous network within the structure.

EXAMPLE III

Using a standard 12-inch ball mill of 6-inch depth and having ceramic balls of ½-inch average size, a mixture of 142 grams of LaNi$_5$ powder and 5 grams of Teflon 7A are mixed at 60 to 60 RPM for 16 hours to fibrillate the polymer in the presence of the active material.

On a pre-heated two-roll rubber mill set at 75° C. with a nip of 0.010 is placed 40 grams of WRSN-10 and 9 grams of United States Industries' FN-500 (a low density polyethylene). The materials are mixed on the rolls for two minutes until a band is formed. Thereafter, the mixture of fibrillated Teflon 7A and LaNi$_5$ obtained from the ball mill is slowly added to the band of polyethylene and poreformer on the mill. The mix is periodically peeled from the mill and folded to insure homogeneity. After five minutes of mixing in this manner, the product is peeled from the mill as a sheet of active LaNi$_5$ encradled in a fiber-containing polymeric material.

EXAMPLE IV

A porous, fiber-containing polymeric structure with LaNi$_5$ particles encradled therein was prepared using a method similar to that shown in Example I, and its absorption kinetics were determined by constant pressure absorption of hydrogen. In this test the reaction half-time was determined to be 8 minutes at 60 psia.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A method of preparing a polymeric active composition which can be developed into a shaped structure, said structure comprising solid active material encradled in a porous, fiber-containing polymeric material with maximized exposure of the surfaces of the active material, said method comprising providing the components of said composition as a substantially dry formulation comprising a support-contributing polymer, a fibrillatable polymer, an active material and a major amount of removable pore-former, subjecting said formulation to shear stresses at an elevated temperature to convert the fibrillatable polymer to a fibrous form and to form an intimate mixture of fibers, support-contributing polymer, active material and a major amount of removable pore-former, and shaping the fibrillated composition, thereby providing a shaped polymeric active composition in which porosity can be effected by removal of the pore-former with the resultant pores being interconnecting and dispersed throughout the structure.

2. A method according to claim 1, characterized in that the pore-former is soluble in water.

3. A method according to claim 2, characterized in that the pore-former is present in an amount of about 70% to about 80% by volume.

4. A method according to claim 1, characterized in that the polymeric active composition is prepared in a particulate form.

5. A method according to claim 5, characterized in that the polymeric active composition is prepared as a shaped product in the form of a sheet, bar, film, cylinder, ring, sphere, or pellet.

6. A method according to claim 1, characterized in that the polymeric active composition is comprised, by weight, of about 50% to about 75% active material, about 0.5% to about 5% fibrillatable polymer, about 47% to about 10% removable pore-former and the balance essentially support-contributing polymer.

7. A method according to claim 2, characterized in that the pore-former is a polymer having a molecular weight of about 100,000 to 1,000,000.

8. A method according to claim 2, characterized in that the pore-former is a polyethylene oxide, a polypropylene oxide, or a combination thereof.

9. A method according to claim 1, characterized in that the support contributing polymer is at least one polymer selected from the group consisting of polyethylene, polypropylene, polybutylene, polyisobutylene, and co-polymers thereof with each other of with ethylacrylate and/or vinyl acetate; halogenated polyhydrocarbons and co-polymers thereof; polyamides, polysulfones; polyacetates; polycarbonates; polyesters; cellulose esters or silicones.

10. A method according to claim 1, characterized in that the support-contributing polymer is a substantially saturated thermoplastic polymer.

11. A method according to claim 1, characterized in that the poreformer wets or can be made to wet the surfaces of the active material.

12. A method according to claim 1, characterized in that the components of the formulation are intimately mixed at a temperature in the range of about 65° C. to about 100° C.

13. A method according to claim 1, characterized in that the fibrillatable polymer and active material are mixed together independently of the mixture of support-contributing polymer and pore-former, and then the mixture of fibrillatable polymer and active material is added to the mixture of support-contributing polymer and pore-former.

14. A method of preparing a polymeric active composition which can be developed into a shaped structure, said structure comprising active material encradled in a porous, fiber-containing polymeric material with maximized exposure of the surfaces of the active material, said method comprising providing the components of said composition as a substantially dry formulation comprised, by weight, of about 50% to about 75% solid active material, about 0.5% to about 5% fibrillatable polymer, 47% to about 10% removable pore-former and the balance essentially support-contributing polymer, said removable pore-former being a water-soluble polymer and being capable of wetting the active material, subjecting said formulation to shear stresses to convert the fibrillatable polymer to a fibrous form, forming the components at an elevated temperature into an intimate mixture of fibers, support-contributing polymer, active material and pore-former, and shaping the fibrillated composition, thereby providing a shaped polymeric active composition in which porosity can be effected by leaching the pore-former from the shaped structure with water, with resultant pores being interconnecting and dispersed throughout the material.

15. A method according to claim 14, wherein the pore-former is removed from the shaped polymeric active composition by leaching with water.

16. A method of preparing a polymeric active composition which can be developed into a shaped structure, said structure comprising active material encradled in a porous, fiber-containing polymeric material with maximized exposure of the surfaces of the active material, said method comprising providing the components of said composition as a substantially dry formulation comprising a support-contributing polymer, a fibrillatable polymer, a solid active material and a major amount of removable pore-former, said pore-former being solubilizable in an aqueous agent, subjecting said formulation to shear stresses to convert the fibrillatable polymer to a fibrous form, forming the components into an intimate mixture of fibers, support-contributing polymer active material and a major amount of removable pore-former, and shaping the fibrillated composition, thereby providing a shaped polymeric active composition in which porosity can be effected by removal of the pore-former with an aqueous agent, with the resultant pores being interconnecting and dispersed throughout the structure.

* * * * *